United States Patent
Fu et al.

(10) Patent No.: US 10,032,539 B2
(45) Date of Patent: *Jul. 24, 2018

(54) ELASTOMER-BASED POLYMERIC COMPOSITIONS HAVING AMORPHOUS SILICA FILLERS

(71) Applicant: Dow Global Technologies LLC, Midland, MI (US)

(72) Inventors: Lin Fu, Naperville, IL (US); Paul J. Caronia, Annadale, NJ (US); Susan Song, High Bridge, NJ (US); Timothy J. Person, Pottstown, PA (US)

(73) Assignee: Dow Global Technologies LLC

( * ) Notice: Subject to any disclaimer, the term of this patent is extended or adjusted under 35 U.S.C. 154(b) by 0 days.

This patent is subject to a terminal disclaimer.

(21) Appl. No.: 15/460,609

(22) Filed: Mar. 16, 2017

(65) Prior Publication Data

US 2017/0186509 A1 Jun. 29, 2017

Related U.S. Application Data

(63) Continuation of application No. 14/646,251, filed as application No. PCT/US2013/074389 on Dec. 11, 2013, now Pat. No. 9,631,110.

(60) Provisional application No. 61/739,100, filed on Dec. 19, 2012.

(51) Int. Cl.
| | |
|---|---|
| *C08K 3/34* | (2006.01) |
| *H01B 3/02* | (2006.01) |
| *C08K 3/36* | (2006.01) |
| *C08K 9/06* | (2006.01) |
| *H01B 7/02* | (2006.01) |
| *H01B 9/00* | (2006.01) |

(52) U.S. Cl.
CPC ............ *H01B 3/02* (2013.01); *C08K 3/36* (2013.01); *C08K 9/06* (2013.01); *H01B 7/02* (2013.01); *H01B 9/006* (2013.01)

(58) Field of Classification Search
CPC . H01B 3/02; H01B 7/02; H01B 9/006; C08K 3/36
USPC .......................................................... 524/493
See application file for complete search history.

(56) References Cited

U.S. PATENT DOCUMENTS

| | | | |
|---|---|---|---|
| 4,125,509 A | 11/1978 | Vostovich | |
| 9,240,260 B2 | 1/2016 | Hatanaka et al. | |
| 2010/0015404 A1 | 1/2010 | Paul et al. | |
| 2011/0209895 A1* | 9/2011 | Saito | H01B 3/28 174/107 |
| 2013/0269976 A1 | 10/2013 | Sarkar et al. | |
| 2015/0187464 A1 | 7/2015 | Fagrell et al. | |

FOREIGN PATENT DOCUMENTS

WO 2009021050 A2 2/2009

OTHER PUBLICATIONS

PCT/US2013/074389, International Search Report & Written Opinion of the International Searching Authority dated Mar. 6, 2014.
PCT/US2013/074389, International Preliminary Report on Patentability dated Jul. 2, 2015.
PCT/US2013/074389, Response Article 19 filed Nov. 15, 2011.
Cabot, "CAB-O-SIL TS-720 Fumed Silica", p. 1-2, downloaded on Dec. 20, 2016.
Evonik Industries, "Product Overview—Aerosil", p. 1-11 downloaded on Dec. 20, 2016.

* cited by examiner

*Primary Examiner* — Hui Chin

(57) ABSTRACT

Polymeric compositions suitable for use as insulation materials in electrical applications. Such polymeric compositions comprise an ethylene/α-olefin-based elastomer and a filler, where the filler consists essentially of an amorphous silica. Such polymeric compositions can optionally further comprise an ethylene-based thermoplastic polymer. Also disclosed are coated conductors comprising such polymeric compositions as insulation materials.

10 Claims, No Drawings

ELASTOMER-BASED POLYMERIC COMPOSITIONS HAVING AMORPHOUS SILICA FILLERS

FIELD

Various embodiments of the present invention relate to elastomer-based polymeric compositions comprising amorphous silica fillers. Other aspects of the invention concern articles of manufacture comprising such elastomer-based polymeric compositions as electrical insulation materials, such as in wires and cables.

INTRODUCTION

Currently, elastomer-based polymeric compounds used as electrically insulating materials employ approximately 60 parts-per-hundred polymer ("phr") clay to achieve good processing performance in flexible cable applications. Clay fillers are generally required components of the polymeric composition since the elastomer extrudate quality is very poor at peroxide crosslink melt temperatures. Clay fillers resolve this issue by providing acceptable melt extrudate quality as well as providing sufficient melt strength to maintain cable concentricity. Unfortunately, clay fillers also increase the electrical loss properties of the compound (e.g., cause a high tan delta) to a level much higher than the neat elastomer. Accordingly, improvements are desired regarding filler materials for such elastomer-based polymeric compounds intended for use as electrical insulation materials.

SUMMARY

One embodiment is a polymeric composition for use in coated conductors, said polymeric composition comprising:
(a) an ethylene/α-olefin-based elastomer; and
(b) a filler,
wherein said filler consists essentially of an amorphous silica.

DETAILED DESCRIPTION

Various embodiments of the present invention concern elastomer-based polymeric compositions. These compositions comprise an elastomer and a filler, where the filler consists essentially of an amorphous silica. These compositions may also optionally comprise an ethylene-based thermoplastic polymer. Such polymeric compositions can be suitable for use as electrical insulating materials in wire or cable applications.

Polymeric Composition

As noted above, one component of the polymeric compositions described herein is an elastomer (i.e., an elastomeric polymer). As used herein, "elastomer" denotes a polymer having viscoelasticity, and can be either a thermoset or a thermoplastic. "Polymer" means a macromolecular compound prepared by reacting (i.e., polymerizing) monomers of the same or different type. "Polymer" includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)). In an embodiment, the elastomer is a thermoplastic elastomer.

Elastomers suitable for use herein are ethylene/alpha-olefin ("α-olefin") elastomers, which can optionally also have polymerized therein one or more types of diene monomers (e.g., an "EPDM" elastomer). Thus, in various embodiments, the elastomer is an interpolymer having polymerized therein ethylene and an α-olefin comonomer. In one embodiment, the elastomer is a homogeneously branched linear ethylene/α-olefin copolymer or a homogeneously branched, substantially linear ethylene/α-olefin copolymer. The α-olefin monomers suitable for use in the elastomer component include $C_{3-20}$ (i.e., having 3 to 20 carbon atoms) linear, branched, or cyclic α-olefins. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin elastomers include ethylene/propylene, ethylene/butene, ethylene/1-hexene, ethylene/1-octene, ethylene/styrene, ethylene/propylene/1-octene, ethylene/propylene/butene, and ethylene/butene/1-octene. In one or more embodiments, the elastomer can be selected from the group consisting of an ethylene/propylene copolymer, an ethylene/α-butene copolymer, an ethylene/α-hexene copolymer, an ethylene/α-octene copolymer, an EPDM, or combinations of two or more thereof. In various embodiments, the elastomer is a copolymer of ethylene/α-butene, ethylene/α-hexene, ethylene/α-octene, or combinations of two or more thereof. In an embodiment, the elastomer is an EPDM.

Elastomers suitable for use herein can have a density ranging from 0.85 to 0.93 $g/cm^3$, 0.86 to 0.91 $g/cm^3$, from 0.86 to 0.90 $g/cm^3$, or from 0.86 to 0.89 $g/cm^3$. Polymer densities provided herein are determined according to ASTM International ("ASTM") method D792 or D1505. Elastomers suitable for use herein can have a melt index ($I_2$) ranging from 0.1 to 30 g/10 min., from 0.1 to 15 g/10 min., from 0.2 to 10 g/10 min., from 0.3 to 5 g/10 min., or from 0.5 to 2 g/10 min. Melt indices provided herein are determined according to ASTM method D1238. Unless otherwise noted, melt indices are determined at 190° C. and 2.16 Kg (a.k.a., $I_2$). Elastomers suitable for use can have a Mooney viscosity ML 1+4 @ 121° C. or 125° C. in the range from 10 to 90, from 15 to 70 or from 15 to 30. Mooney viscosity is determined according to ASTM D1646, where M represents Mooney, L represents a large rotor, 1 represents a 1 minute preheat time, 4 represents a 4-minute mark after starting the motor at which the reading is taken, and 121 or 125° C. represents the test temperature.

Production processes used for preparing the above-described elastomers are wide, varied, and known in the art. Any conventional or hereafter discovered production process for producing elastomers having the properties described above may be employed for preparing the elastomers described herein.

Commercial examples of elastomers suitable for use herein include ENGAGE™ polyolefin elastomers (e.g., ENGAGE™ 8100, 8003, 8401, 8411, 8842, 8200, 7447, or 7467 polyolefin elastomers); AFFINITY™ polyolefin plastomers; and NORDEL™ IP EPDM elastomers, all available from The Dow Chemical Company, Midland, Mich., USA. Additional commercially available elastomers include EXACT™ plastomers and VISTALON™ EPDM rubber, all available from ExxonMobil Chemical, Houston, Tex., USA.

In an embodiment, the ethylene/α-olefin-based elastomer can comprise a combination of any two or more of the above-described ethylene/α-olefin-based elastomers.

As noted above, the polymeric composition comprises a filler, which consists essentially of an amorphous silica. In other words, the polymeric composition does not contain more than trace amounts (e.g., 10 parts per million based on the entire polymeric composition weight) of any other filler material. In an embodiment, the filler consists of amorphous silica. The term "filler" denotes a chemically inert inorganic material. "Amorphous silica" denotes an inorganic filler that is amorphous (i.e., non-crystalline or low crystallinity) silicon dioxide ("$SiO_2$"). Amorphous silica lacks a long range order, and is to be distinguished from crystalline silica (i.e., quartz). Amorphous silica includes "fused quartz" or "fused silica," which are silica glass of amorphous silica. These are made by melting crystalline silica (naturally occurring quartz) into a non-crystalline form. Additionally, synthetic fused silica can be manufactured through pyrolysis of silicon tetrachloride or vaporized quartz to form tiny droplets of amorphous silica which fuse into an articulated structure of particles. Such a form of synthetic fused silica is also known as fumed silica. Amorphous silica may also be precipitated from solution to form small porous particles which can fuse together in chains. Such a form of silica is known as a silica gel, which can be used to form silica aerogels. Adjusting the solution pH can keep the particles separated to form larger individual particles commonly referred to as precipitated silica or silica sols, all of which are forms of amorphous silica. In various embodiments, the amorphous silica is solid at 22° C. and standard atmospheric pressure. In an embodiment, the amorphous silica is selected from the group consisting of silica aerogels, fumed silica, and combinations thereof.

In various embodiments, particularly when a fumed silica is employed as the amorphous silica filler, the amorphous silica can be treated with a surface treatment. Such surface treatments include, but are not limited to, polydimethylsiloxane coatings and vinyl alkoxy silanes. Generally, such surface treatments will constitute no more than 10 weight percent ("wt %") of the entire filler material, and may generally be less than 5 wt %, based on the entire filler weight.

As noted above, the polymeric composition contains no more than trace amounts of any filler (i.e., chemically inert inorganic material) other than the amorphous silica. Such other fillers include, but are not limited to, materials composed of metal cations and silicates, such as clay (which is aluminum silicate, or $Al(SiO_4^{4-})$), talc (which is magnesium silicate, or $Mg_3(SiO_3)_4$), sodium silicate ($Na_2SiO_2(OH)_2$), and calcium silicate ($Ca_2SiO_4$), among others. Other filler types intended to be excluded include metal hydrates (such as magnesium hydroxide and aluminum hydroxide), metal carbonic acids (such as calcium carbonate), certain inert metal oxides (such as magnesium oxide and aluminum oxide), and carbon black.

In contrast to other filler types, conventional additives used in electrical insulation materials are not particularly excluded from use in the present polymeric composition. Such conventional additives include, for example, antioxidants, coupling agents, ultraviolet absorbers or stabilizers, antistatic agents, pigments, dyes, nucleating agents, polymer additives, slip agents, plasticizers, processing aids, lubricants, viscosity control agents, tackifiers, anti-blocking agents, surfactants, extender oils, metal deactivators, voltage stabilizers, crosslinking agents, boosters, and catalysts. Additives can be added in amounts ranging from less than about 0.1 to more than about 200 parts by weight for each 100 parts by weight of the base polymer.

Examples of antioxidants are as follows, but are not limited to: hindered phenols such as tetrakis[methylene(3,5-di-tert-butyl-4-hydroxyhydro-cinnamate)]methane, bis[beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; various amines, such as polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers; bis[(beta-(3,5-ditert-butyl-4-hydroxybenzyl)-methylcarboxyethyel)]sulphone; and phosphites and phosphonites such as tri(2,4-di-tert-butylphenyl)phosphite and di-tert-butylphenyl-phosphonite. Antioxidants can be used in amounts of about 0.1 to about 5 wt % based on the weight of the composition.

Examples of cross-linking agents are as follows: dicumyl peroxide; bis(alpha-t-butyl-peroxyisopropyl)benzene; isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; di(isopropylcumyl) peroxide; or mixtures thereof. Peroxide curing agents can be used in amounts of about 0.1 to 5 wt % based on the entire weight of the polymeric composition. Various other known curing co-agents, boosters, and retarders, can be used, such as triallyl isocyanurate, ethyoxylated bisphenol A dimethacrylate, α-methyl styrene dimer, and other co-agents described in U.S. Pat. Nos. 5,346,961 and 4,018,852.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or n,n'-ethylenebisstearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of about 0.05 to about 5 wt % based on the entire weight of the polymeric composition.

Still other additives that are not to be considered fillers include polyethylene glycol; ethylenically unsaturated compounds having one or more $Si(OR)_3$ groups, such as vinyltrimethoxysilane, vinyltriethoxysilane, and gamma-methacryloxypropyltrimethoxy-silane; dibutyltin dilaurate; dioctyltin maleate; dibutyltin diacetate; stannous acetate; lead naphthenate; zinc caprylate; and metal oxide stabilizers, such as lead oxide, zinc oxide, and titanium dioxide.

As noted above, the polymeric composition can optionally also contain an ethylene-based thermoplastic polymer. As used herein, "ethylene-based" polymers are polymers prepared from ethylene monomers as the primary (i.e., greater than 50 wt %) monomer component, though other co-monomers may also be employed. As known in the art, "thermoplastic" polymers are typically un-crosslinked polymers that become softer upon heating. In various embodiments, the ethylene-based thermoplastic polymer can be an ethylene homopolymer. As used herein, "homopolymer"

denotes a polymer comprising repeating units derived from a single monomer type, but does not exclude residual amounts of other components used in preparing the homopolymer, such as chain transfer agents.

In an embodiment, the ethylene-based thermoplastic polymer can be an ethylene/α-olefin interpolymer having an α-olefin content of at least 1 wt %, at least 5 wt %, at least 10 wt %, at least 15 wt %, at least 20 w t%, or at least 25 wt % based on the entire interpolymer weight. These interpolymers can have an α-olefin content of less than 50 wt %, less than 45 wt %, less than 40 wt %, or less than 35 wt % based on the weight of the interpolymer.

When an α-olefin is employed, the α-olefin can be a $C_{3-20}$ (i.e., having 3 to 20 carbon atoms) linear, branched, or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/butene, ethylene/1-hexene, ethylene/1-octene, ethylene/styrene, ethylene/propylene/1-octene, ethylene/propylene/butene, and ethylene/butene/1-octene.

In various embodiments, the ethylene-based thermoplastic polymer can be used alone or in combination with one or more other types of ethylene-based thermoplastic polymers (e.g., a blend of two or more ethylene-based thermoplastic polymers that differ from one another by monomer composition and content, catalytic method of preparation, etc). If a blend of ethylene-based thermoplastic polymers is employed, the polymers can be blended by any in-reactor or post-reactor process.

In various embodiments, the ethylene-based thermoplastic polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based thermoplastic polymer can be an LDPE. LDPEs are generally highly branched ethylene homopolymers, and can be prepared via high pressure processes. LDPEs suitable for use herein can have a density ranging from 0.910 to 0.930 g/cm³, from 0.917 to 0.925 g/cm³, or from 0.919 to 0.924 g/cm³. LDPEs suitable for use herein can have a melt index ($I_2$) ranging from 0.1 to 8.0 g/10 min Generally, LDPEs have a broad molecular weight distribution ("MWD") resulting in a high PDI. LDPEs suitable for use herein can have a PDI ranging from 4.0 to 12.0. PDIs provided herein are determined by gel permeation chromatography.

Examples of commercially available LDPEs that can be employed include DFDA-1253 NT; DOW™ LDPE 132i; DOW™ LDPE 133A; DOW™ LDPE 501i; and DOW™ LDPE 535i, all available from The Dow Chemical Company, Midland, Mich., USA.

In an embodiment, the ethylene-based thermoplastic polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.917 to 0.941 g/cm³, from 0.918 to 0.930 g/cm³, or from 0.918 to 0.922 g/cm³. LLDPEs suitable for use herein can have a melt index ($I_2$) ranging from 0.2 to 1.5 g/10 min, from 0.3 to 1.0 g/10 min, or from 0.5 to 0.8 g/10 min LLDPEs suitable for use herein can have a PDI ranging from 2.5 to 16.

Examples of commercially available LLDPEs that can be employed include DFDA-7530 NT, and DFDA-7540 NT, both available from The Dow Chemical Company, Midland, Mich., USA.

In an embodiment, the ethylene-based thermoplastic polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.880 to 0.910 g/cm³, or from 0.883 to 0.886 g/cm³. VLDPEs suitable for use herein can have a melt index ($I_2$) ranging from 0.5 to 2.5 g/10 min, from 0.55 to 1.0 g/10 min, or from 0.60 to 0.90 g/10 min VLDPEs suitable for use herein can have a PDI ranging from 3 to 6, or from 4 to 5.

Examples of commercially available VLDPEs that can be employed include FLEXOMER™ VLDPEs, such as DFDB-1085 NT, DFDA-1137 NT, ETS 9078 NT7, and ETS 9066 NT7, each available from The Dow Chemical Company, Midland, Mich., USA.

In an embodiment, the ethylene-based thermoplastic polymer can comprise a combination of any two or more of the above-described ethylene-based thermoplastic polymers.

Production processes used for preparing ethylene-based thermoplastic polymers are wide, varied, and known in the art. Any conventional or hereafter discovered production process for producing ethylene-based thermoplastic polymers having the properties described above may be employed for preparing the ethylene-based thermoplastic polymers described herein.

The polymeric composition can comprise the above-described elastomer component in an amount ranging from 40 to 98 wt %, from 45 to 85 wt %, from 50 to 80 wt %, or from 53 to 76 wt %, based on the entire polymeric composition weight. The filler can be present in the polymeric composition in an amount ranging from 1 to 50 wt %, from 5 to 40 wt %, from 10 to 32 wt %, or from 15 to 20 wt %, based on the entire polymeric composition weight. Additionally, the ethylene-based thermoplastic polymer, when employed, can be present in an amount ranging from 1 to 10 wt %, from 1.5 to 5 wt %, or from 2 to 3 wt %, based on the entire polymeric composition weight.

The polymeric composition comprising the elastomer and the filler (i.e., amorphous silica), and optionally the ethylene-based thermoplastic polymer, can be prepared by any conventional or hereafter discovered methods. For example, preparation of the polymeric composition can comprise compounding the above-described components. Compounding of the polymeric composition can be effected by standard equipment known to those skilled in the art. Examples of compounding equipment are internal batch mixers, such as a Brabender™, Banbury™, or Bolling™ mixer. Alternatively, continuous single or twin screw, mixers can be used, such as a Farrel™ continuous mixer, a Werner and Pfleiderer™ twin screw mixer, or a Buss™ kneading continuous extruder. Compounding can be performed at a temperature of greater than the melting temperature of the elastomer or, if present, greater than the melting temperature of the ethylene-based thermoplastic polymer, whichever is greater, and up to a temperature above which the elastomer begins to degrade or up to a temperature at which the ethylene-based thermoplastic polymer, if present, begins to degrade, whichever is less. In various embodiments, compounding can be performed at a temperature ranging from 100 to 230° C., or from 110 to 180° C.

In various embodiments, the polymeric composition can optionally be crosslinked. This can be accomplished by first preparing a crosslinkable polymeric composition in two steps. In the first step, the ethylene/α-olefin based elastomer, the filler, and optionally the ethylene-based thermoplastic polymer are combined with the additives except the cross-linking agent (typically an organic peroxide) and compounded as described above. Then the temperature of this compounded mixture is lowered to 110 to 120° C. The temperature may be lowered by any number of procedures with the two most common practices being to either remove the compounded material from the mixer, cooling to less than 100° C. and then reloading the compounded material to either the mixer or a two roll mill and operating in a temperature range of 110 to 120° C. Another typical process is to cool the compounded material in the mixer to the 110 to 120° C. temperature range. The crosslinking additive is then mixed into the compounded material. The material is then removed and cooled to room temperature, forming the crosslinkable polymeric composition. The material is cross-linked by exposing the crosslinkable polymeric composition to a temperature above 160° C. to initiate decomposition of the peroxide for the crosslinking process. Crosslinking with peroxides can be conducted under pressure to prevent void formation.

It should be noted that, although a crosslinking procedure has just been described, the polymeric composition described above may be employed in either its thermoplastic state (i.e., un-crosslinked) or its thermoset state (i.e., cross-linked).

Coated Conductor

A cable comprising a conductor and an insulation layer can be prepared employing the above-described polymeric composition. "Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

Such a cable can be prepared with various types of extruders (e.g., single or twin screw types) by extruding the polymeric composition onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Optionally, following extrusion, the extruded cable can pass into a heated cure zone downstream of the extrusion die to aid in cross-linking the polymeric composition and thereby produce a cross-linked polymeric composition. The heated cure zone can be maintained at a temperature in the range of 175 to 260° C. In an embodiment, the heated cure zone is a continuous vulcanization ("CV") tube. In various embodiments, the cross-linked polymeric composition can then be cooled and degassed.

Alternatively, if the polymeric composition is to remain un-crosslinked, the extruded cable can pass into a cooling zone, such as a water trough, to be cooled.

Alternating-current cables prepared according to the present disclosure can be low-voltage, medium-voltage, high-voltage, or extra-high-voltage cables. Further, direct-current cables prepared according to the present disclosure include high or extra-high-voltage cables. In an embodiment, the coated conductor is a medium-voltage cable. Additionally, cables prepared according to the present disclosure can have target voltage ratings ranging from 200 V up to 50 kV, from 1 kV up to 50 kV, from 1 kV up to 30 kV, or from 5 kV up to 45 kV.

Test Methods

Density

Density is determined according to ASTM D 792 or 1505.

Melt Index

Melt index, or $I_2$, is measured in accordance by ASTM D 1238, Condition 190° C./2.16 kg, and is reported in grams eluted per 10 minutes.

Mooney Viscosity

Mooney Viscosity is measured in accordance with ASTM D 1646 using the large rotor, a 1-minute specimen preheat time and taking the reading at 4 minutes after starting the motor. For the EPDM elastomer, the test is conducted at 125° C. For the ethylene-butene and ethylene-octene elastomers the test is conducted at 121° C.

Rheological Evaluations

Capillary rheology assessments are conducted on Bohlin Instruments Rosand Capillary Rheometer (RH7) at a temperature of 140° C. with a 1 mm diameter, 20:1 L/D die. Non-peroxide-containing samples are conditioned in the chamber for 12 minutes at 140° C.; then, the test is initiated with measurements collected at piston speeds of 1.0, 2.0, 3.9, 7.7, 14.9, 29.0, 56.4, 109.8, and 213.6 mm/minute. Extrudate samples are collected at each piston speed and visually characterized for melt fracture under 10× magnification.

A TA Instruments Rheometrics SR200 is used to measure the creep and recovery times for the sample at a temperature of 190° C. using a 25-mm plate. The zero shear viscosity is calculated from this data using its rheological software that identifies a steady flow state and calculates the zero viscosity at this condition.

Flexural Modulus

An Instron Tester using Test Works Software is used to measure the flexural modulus. Testing is conducted per ASTM D790 using three point bending with a 2-inch span between the supports. A press-cured (i.e., compression-molded) plaque sample (½ inch wide, 125 mil thick) is used for the measurements.

Dissipation Factor

A Guildline High Voltage Capacitance Bridge, Model 9910A, is used on 50-mil thick press-cured (i.e., compression-molded) plaque specimens per ASTM D150. A silicone spray is applied to each side of the plaque to prevent the sample sticking to the instrument platens. The sample is placed in the test unit at room temperature. The unit's Oscilloscope (9430 detector) is turned on and a sensitivity setting of 1 is used. The Cx/Cs (capacitance setting) is adjusted to bring the two circles in the oscilloscope screen into phase to obtain one straight horizontal (flat/closed) line. Then a sensitivity of 2 is selected and the Cx/Cs (capacitance setting) is adjusted to bring the two circles in the oscilloscope screen into phase to obtain one straight horizontal (flat/closed) line. This same procedure is repeated for a sensitivity setting of 3. At a sensitivity of 4, a similar procedure is followed and an initial dissipation factor is obtained from the equipment. At a sensitivity of 5, using a similar procedure, the Cx/Cs (capacitance setting) is adjusted to bring the oscilloscope's circles in phase, and the dissipation factor control is adjusted until the circles condense into a flat line to obtain an exact dissipation factor reading. This exact dissipation factor is recorded for the sample.

Compression Molding

Sample preparation for press-cured samples involves compression molding the crosslinkable material in an electric Wabash Gensis press using a compression mold thickness of 50 mils or 125 mils. The press is operated by:

3 minutes Low Pressure (500 psi) @ 125° C.;
5 minutes High Pressure (2500 psi) @ 125° C.;
Quench cool;
Remove from plaque and cut it into four pieces;
Place back into plaque mold and repress;
3 minutes Low Pressure (500 psi) @ 125° C. and gradually raise to High Pressure (2500 psi) @ 125° C.;
20 minutes High Pressure (2500 psi) @ 190° C. to Crosslink;
Quench cool;
Prepare test specimen.

EXAMPLES

Example 1

Extrudate Surface Quality Comparison

Prepare three Comparative Samples (CS A-C) and seven Samples (S1-7) according to the formulations provided in Table 1, below. Prepare the samples in a Brabender mixing bowl at a temperature of 140° C. by adding, with the rotors at 20 RPM, approximately ⅔ of the elastomer, all the DXM-446, and the ERD-90 and fluxing the material. Add the clay or silica filler, Agerite MA, Kadox 920, PAC-473 and Antilux 654 and mix for less than two minutes. Add the remaining elastomer polymer and flux the polymer. Mix for 5 minutes at a rotor speed 30 RPM. Remove the material from the mixer.

The elastomer employed in this example is EPDM, and is commercially available under the trade name NORDEL™ IP 3722 from The Dow Chemical Company, Midland, Mich., USA. NORDEL™ IP 3722 has a density range of 0.86 to 0.88 g/cm$^3$ and a Mooney viscosity (ML 1+4 at 250° C.) of 10 to 30. DXM-446 is an LDPE, which is prepared by The Dow Chemical Company. DXM-446 has a density ranging from 0.920 to 0.93 g/cm$^3$ and a melt index ranging from 1.8 to 2.6. Agerite MA is a polymerized 1,2 dihydro-2,2,4-trimethyl quinoline antioxidant, which is commercially available from R.T. Vanderbilt Company, Norwalk, Conn., USA. KADOX™ 920 is zinc oxide, commercially available from Horsehead Corporation, Pittsburgh, Pa., USA. BURGESS™ KE is a commercially available clay filler, described as a surface-modified, calcined aluminum silicate. BURGESS™ KE is available from the Burgess Pigment Company, Sandersville, Ga., USA. ENOVA™ IC 3100 is an amorphous silica aerogel available from the Cabot Corporation, Boston, Mass., USA. CAB-O-SIL™ 720 is a fumed silica having a polydimethylsiloxane surface treatment, available from the Cabot Corporation, Boston, Mass., USA. FLOWSPERSE™ PAC-473 is a silane in wax carrier, commercially available from Flow Polymers, LLC, Cleveland, Ohio, USA. ANTILUX™ 654 is a paraffin wax, commercially available from Rhein Chemie Rheinau GmbH, Mannheim, Germany. Polydispersion ERD-90 is lead oxide in an EPDM rubber carrier, commercially available from Hammond Lead Products, Hammond, Ind., USA.

TABLE 1

CS A-C and S1-7 Compositions

|  | CS A | CS B | CS C | S1 | S2 | S3 | S4 | S5 | S6 | S7 |
|---|---|---|---|---|---|---|---|---|---|---|
| Nordel IP 3722 (wt %) | 54.1 | 66.8 | 74.4 | 54.1 | 66.3 | 71.4 | 76.4 | 54.1 | 66.3 | 76.4 |
| DXM-446 (wt %) | 2.7 | 2.7 | 2.7 | 2.7 | 2.7 | 2.7 | 2.7 | 2.7 | 2.7 | 2.7 |
| Agerite MA (wt %) | 0.8 | 0.8 | 0.8 | 0.8 | 0.8 | 0.8 | 0.8 | 0.8 | 0.8 | 0.8 |
| Kadox 920 (wt %) | 3.1 | 3.1 | 3.1 | 3.1 | 3.1 | 3.1 | 3.1 | 3.1 | 3.1 | 31 |
| Burgess KE (wt %) | 32.5 | 20.0 | 15.2 | — | — | — | — | — | — | — |
| Enova IC 3100 (wt %) | — | — | — | 32.5 | 20.3 | 15.2 | 10.1 | — | — | — |
| Cab-O-Sil 720 (wt %) | — | — | — | — | — | — | — | 32.5 | 20.3 | 10.1 |
| FlowSperse PAC-473 (wt %) | 1.3 | 1.3 | 1.3 | 1.3 | 1.3 | 1.3 | 1.3 | 1.3 | 1.3 | 1.3 |
| Antilux 654 (wt %) | 2.7 | 2.7 | 2.7 | 2.7 | 2.7 | 2.7 | 2.7 | 2.7 | 2.7 | 2.7 |
| Polydispersion ERD-90 (wt %) | 2.7 | 2.7 | 2.7 | 2.7 | 2.7 | 2.7 | 2.7 | 2.7 | 2.7 | 2.7 |
| Total: | 100 | 100 | 100 | 100 | 100 | 100 | 100 | 100 | 100 | 100 |

Analyze Comparative Samples CS A-C and Samples S1-7 for rheological properties according to the procedures described above. Results are provided in Table 2, below.

TABLE 2

Rheological Properties of CS A-C and S1-7

|  | CS A | CS B | CS C | S1 | S2 | S3 | S4 | S5 | S6 | S7 |
|---|---|---|---|---|---|---|---|---|---|---|
| Zero shear viscosity: SR200, Creep & | 1.28 × E5 | 1.004 × E5 | 8.154 × E4 | 3.055 × E8 | 2.715 × E7 | 8.16 × E6 | 1.751 × E6 | 1.027 × E8 | 3.348 × E6 | 3.233 × E5 |

TABLE 2-continued

Rheological Properties of CS A-C and S1-7

|  | CS A | CS B | CS C | S1 | S2 | S3 | S4 | S5 | S6 | S7 |
|---|---|---|---|---|---|---|---|---|---|---|
| Recovery at 190° C. (Pa * s) |  |  |  |  |  |  |  |  |  |  |
| Viscosity (Pa * s) at onset of melt fracture (shear rate 1/s) | 629 (444 1/s) | 754 (315 1/s) | 625 (366 1/s) | 72 (7400 1/s) | 1331 (224 1/s) | 819 (391 1/s) | 800 (356 1/s) | N/A | 532 (719 1/s) | 487 (633 1/s) |
| Shear Stress (kPa) at onset of melt fracture (shear rate 1/s) | 279 (444 1/s) | 238 (315 1/s) | 229 (366 1/s) | 533 (7440 1/s) | 298 (224 1/s) | 320 (391 1/s) | 285 (356 1/s) | N/A | 382 (719 1/s) | 308 (633 1/s) |
| Extrudate Surface Quality |  |  |  |  |  |  |  |  |  |  |
| Speed (mm/min.) |  |  |  |  |  |  |  |  |  |  |
| 1.0 | S | S | S | S | S | S | S | S | S | S |
| 2.0 | S | S | S | S | Onset | S | S | S | S | S |
| 3.9 | Onset | Onset | Onset | S | MF | Onset | Onset | S | S | S |
| 7.7 | MF | MF | MF | S | MF | MF | MF | S | Onset | Onset |
| 14.9 | MF | MF | MF | S | MF | MF | MF | S | MF | MF |
| 29.0 | MF | MF | GMF | Onset | MF | MF | GMF | S | MF | GMF |
| 56.4 | MF | GMF | GMF | MF | MF | MF | GMF | S | GMF | GMF |
| 109.8 | MF | GMF | GMF | MF | MF | MF | MF | S | GMF | GMF |
| 213.6 | MF | GMF | GMF | MF | MF | MF | MF | NS | GMF | MF |

S = Smooth
NS = no sample collected
Onset = onset of melt fracturing
MF = melt fractured
GMF = grossly melt fractured The data provided in Table 2, above, indicates that the amorphous silica filler level can be lowered to enable improved melt fracture while maintaining a zero shear viscosity level comparable to formulations having higher clay filler loadings. This result demonstrates that formulations containing amorphous silica as substantially the only filler will allow extruded formulations to better maintain their product dimensions after extrusion. Additionally, even at the same filler loading levels, later onset of melt fracture using the amorphous silica filler will allow processing of extruded articles at higher speeds.

Example 2

Flexural Modulus

Measure the flexural modulus of Comparative Sample CS A, and Samples S1 and S5 after crosslinking the samples by first adding 1.33 wt % of Perkadox BC-FF peroxide to each sample, then curing the test specimen in a compression molding press according to the above-described procedure. PERKADOX™ BC-FF is a dicumyl peroxide, available from Akzo Nobel N.V., Amsterdam, Netherlands. The flexural modulus of CS A is 4,975 psi (34.30 MPa), flexural modulus of S1 is 6,146 psi (42.38 MPa), and the flexural modulus of S5 is 6,622 psi (45.66 MPa).

Example 3

Effect of Filler Loading on Dissipation Factor and Flexural Modulus

Prepare two additional Comparative Samples (CS D and CS E). CS D contains no clay filler and 85.43 weight percent of NORDEL™ IP 3722, but is otherwise identical to CS A-C, described above in Example 1. CS E contains 10 wt % clay filler (BURGESS™ KE) and 75.43 wt % NORDEL™ IP 3722, but is otherwise identical to CS A-C, described above in Example 1. Crosslink Comparative Samples CS A, CS D, and CS E by adding 1.33 wt % peroxide to the samples and curing the samples according to the same procedure described in Example 2 and the Test Methods section, above. Evaluate Comparative Samples CS A, CS D, and CS E for dissipation factor ("DF") and flexural modulus according to the method provided above. CS D, with no clay filler, has a DF of 0.002594 and a flexural modulus of 28.165 MPa; CS E, with 10 wt % clay filler, has a DF of 0.003706 and a flexural modulus of 34.42 MPA; and CS A, with 32.03 wt % clay filler, has a DF of 0.010494 and a flexural modulus of 59.317 MPa. This result indicates that higher filler loadings increase the composition's dissipation factor as well as its flexural modulus.

Example 4

Additional Samples for Extrudate Surface Quality Analysis

Prepare one additional Comparative Sample (CS F) and 12 additional Samples (S8-S19) according to the formulations provided in Table 3, below. In these Samples, the elastomer is either ENGAGE™ 7447 or ENGAGE™ 8200. ENGAGE™ 7447 is an ethylene-butene elastomer available from The Dow Chemical Company, Midland, Mich., USA. ENGAGE™ 7447 has a density ranging from 0.862 to 0.868 g/cm$^3$, an $I_2$ of from 4.0 to 6.0 g/10 min., a total crystallinity of 13%, a Shore A hardness of 64, a DSC melting peak of 25° C. (rate 10° C./min), and a Tg of −53° C. (DSC deflection point). ENGAGE™ 8200 is an ethylene-octene elastomer available from The Dow Chemical Company, Midland, Mich., USA. ENGAGE™ 8200 has a density ranging from 0.867 to 0.873 g/cm$^3$, an $I_2$ of from 4.0 to 6.0 g/10 min., a total crystallinity of 19%, a Shore A hardness of 66, a DSC melting peak of 59° C. (rate 10° C./min), and a Tg of −53° C. (DSC deflection point). The remaining components are the same as described above in Example 1.

TABLE 3

CS F and S8-19 Compositions

| | CS F | S8 | S9 | S10 | S11 | S12 | S13 | S14 | S15 | S16 | S17 | S18 | S19 |
|---|---|---|---|---|---|---|---|---|---|---|---|---|---|
| Engage 7447 (wt %) | 53.4 | 53.4 | 56.07 | 70.43 | 53.4 | 56.07 | 70.43 | — | — | — | — | — | — |
| Engage 8200 (wt %) | — | — | — | — | — | — | — | 53.4 | 56.07 | 70.43 | 53.4 | 56.07 | 70.43 |
| DXM-446 (wt %) | 2.67 | 2.67 | — | 2.67 | 2.67 | — | 2.67 | 2.67 | — | 2.67 | 2.67 | — | 2.67 |
| Agerite MA (wt %) | 0.8 | 0.8 | 0.8 | 0.8 | 0.8 | 0.8 | 0.8 | 0.8 | 0.8 | 0.8 | 0.8 | 0.8 | 0.8 |
| Kadox 920 (wt %) | 3.1 | 3.1 | 3.1 | 3.1 | 3.1 | 3.1 | 3.1 | 3.1 | 3.1 | 3.1 | 3.1 | 3.1 | 3.1 |
| Burgess KE (wt %) | 32.03 | — | — | — | — | — | — | — | — | — | — | — | — |
| Enova IC 3100 (wt %) | — | 32.03 | 32.03 | 15 | — | — | — | 32.03 | 32.03 | 15 | — | — | — |
| Cab-O-Sil 720 (wt %) | — | — | — | — | 32.03 | 32.03 | 15 | — | — | — | 32.03 | 32.03 | 15 |
| FlowSperse PAC-473 (wt %) | 1.33 | 1.33 | 1.33 | 1.33 | 1.33 | 1.33 | 1.33 | 1.33 | 1.33 | 1.33 | 1.33 | 1.33 | 1.33 |
| Antilux 654 (wt %) | 2.67 | 2.67 | 2.67 | 2.67 | 2.67 | 2.67 | 2.67 | 2.67 | 2.67 | 2.67 | 2.67 | 2.67 | 2.67 |
| Poly-dispersion ERD-90 (wt %) | 2.67 | 2.67 | 2.67 | 2.67 | 2.67 | 2.67 | 2.67 | 2.67 | 2.67 | 2.67 | 2.67 | 2.67 | 2.67 |
| Perkadox BC-ff (wt %) | 1.33 | 1.33 | 1.33 | 1.33 | 1.33 | 1.33 | 1.33 | 1.33 | 1.33 | 1.33 | 1.33 | 1.33 | 1.33 |
| Total: | 100 | 100 | 100 | 100 | 100 | 100 | 100 | 100 | 100 | 100 | 100 | 100 | 100 |

Analyze Comparative Sample CS F and Samples S8-19 for rheological properties according to the procedures described above. Results are provided in Table 4, below.

TABLE 4

Rheological Properties of CS F and S8-19

| | CS F | S8 | S9 | S10 | S11 | S12 | S13 | S14 | S15 | S16 | S17 | S18 | S19 |
|---|---|---|---|---|---|---|---|---|---|---|---|---|---|
| Viscosity (Pa * s) at onset of melt fracture (shear rate) | 548 (644 1/s) | 30 (18572 1/s) | 14 (41645 1/s) | 825 (390 1/s) | N/A | N/A | 866 (333 1/s) | N/A | N/A | 732 (361 1/s) | N/A | N/A | 277 (1215 1/s) |
| Shear Stress (kPa) at onset of melt fracture (shear rate 1/s) | 353 (644 1/s) | 557 (18572 1/s) | 602 (41645 1/s) | 322 (390 1/s) | N/A | N/A | 288 (333 1/s) | N/A | N/A | 264 (361 1/s) | N/A | N/A | 336 (1215 1/s) |
| Extrudate Surface Quality | | | | | | | | | | | | | |
| Speed (mm/min.) | | | | | | | | | | | | | |
| 1.0 | S | S | S | S | S | S | S | S | S | S | S | S | R |
| 2.0 | S | S | S | S | S | S | S | S | S | Onset | S | S | R |
| 3.9 | S | S | S | MF | S | S | MF | S | S | MF | S | S | R |
| 7.7 | MF | S | S | MF | S | S | NS | S | S | MF | S | S | Onset |
| 14.9 | MF | S | S | R | S | NS | S | S | S | MF | S | S | MF |
| 29.0 | MF | S | S | MF | S | S | NS | R | S | MF | S | S | MF |
| 56.4 | MF | Onset | S | MF | S | S | NS | R | R | R | S | S | MF |
| 109.8 | MF | MF | S | NS | NS | NS | NS | R | R | R | R | NS | MF |
| 213.6 | MF | MF | Onset | MF | NS | NS | NS | R | R | R | R | NS | MF |

S = Smooth
R = Rough, but not typical melt fracture appearance
NS = no sample collected
Onset = onset of melt fracturing
MF = melt fractured

The invention claimed is:

1. A polymeric composition for use in coated conductors, said polymeric composition comprising:
   (a) an ethylene/α-olefin-based elastomer; and
   (b) a filler,
   wherein said filler consists essentially of an amorphous silica, and wherein said filler is present in an amount ranging from 10 to 32 weight percent, based on the entire polymeric composition weight, wherein said amorphous silica is solid at 22° C. and standard atmospheric pressure, wherein the amorphous silica is selected from the group consisting of silica gels, silica aerogels, fumed silica, and combinations thereof, wherein the fumed silica is treated with a surface treatment.

2. The polymeric composition of claim 1, wherein said amorphous silica is selected from the group consisting of silica aerogels, fumed silica, and combinations thereof.

3. The polymeric composition of claim 1, wherein said ethylene/α-olefin-based elastomer is selected from the group consisting of an ethylene/propylene copolymer, ethylene/α-butene copolymer, an ethylene/α-hexene copolymer, an ethylene/α-octene copolymer, an ethylene-propylene-diene monomer ("EPDM"), and combinations of two or more thereof.

4. The polymeric composition of claim 1, wherein said ethylene/α-olefin-based elastomer is an EPDM polymer.

5. The polymeric composition of claim 1, wherein said ethylene/α-olefin-based elastomer is present in an amount ranging from 40 to 98 weight percent, based on the entire polymeric composition weight.

6. The polymeric composition of claim 1, wherein said filler consists of said amorphous silica.

7. The polymeric composition of claim 1, further comprising (c) an ethylene-based thermoplastic polymer, wherein said ethylene-based thermoplastic polymer is present in an amount ranging from 1 to 10 weight percent, based on the entire polymeric composition weight.

8. A coated conductor comprising:
   (a) a conductive core; and
   (b) an insulation layer at least partially surrounding said conductive core, wherein at least a portion of said insulation layer consists of the polymeric composition of claim 1.

9. The coated conductor of claim 8, wherein said coated conductor is rated for use at voltages from 200 volts to 50,000 volts.

10. The polymeric composition of claim 1, wherein the surface treatment is a polydimethylsiloxane coating.

* * * * *